United States Patent
Washington et al.

(10) Patent No.: US 12,164,615 B2
(45) Date of Patent: Dec. 10, 2024

(54) POWER KEY AND FINGERPRINT READER

(71) Applicant: Microsoft Technology Licensing, LLC, Redmond, WA (US)

(72) Inventors: David Earl Washington, Saint Paul, MN (US); Natalia Janina Urbanowicz, Seattle, WA (US); Shunjiro Eguchi, Sammamish, WA (US); Alexander Norman Bennett, Seattle, WA (US); Elizabeth Ann Pina, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 18/001,000

(22) PCT Filed: Jun. 8, 2021

(86) PCT No.: PCT/US2021/070672
§ 371 (c)(1),
(2) Date: Dec. 7, 2022

(87) PCT Pub. No.: WO2021/258094
PCT Pub. Date: Dec. 23, 2021

(65) Prior Publication Data
US 2023/0214468 A1    Jul. 6, 2023

(30) Foreign Application Priority Data
Jun. 19, 2020 (NL) .................................... 2025868

(51) Int. Cl.
*G06F 21/32* (2013.01)
*G06F 21/44* (2013.01)
*G06V 40/12* (2022.01)

(52) U.S. Cl.
CPC .............. *G06F 21/32* (2013.01); *G06F 21/44* (2013.01); *G06V 40/1365* (2022.01)

(58) Field of Classification Search
CPC .... G06V 40/1365; G06V 40/13; G06F 21/32; G06F 21/44
See application file for complete search history.

(56) References Cited

U.S. PATENT DOCUMENTS

| | | | |
|---|---|---|---|
| 8,010,798 B1 | 8/2011 | Lemke | |
| 9,672,408 B2 | 6/2017 | Johansson et al. | |

(Continued)

FOREIGN PATENT DOCUMENTS

| | | |
|---|---|---|
| CN | 204408445 U | 6/2015 |
| CN | 105956476 A | 9/2016 |

(Continued)

OTHER PUBLICATIONS

"Inspiron 3481 Setup and Specifications", Retrieved From: https://gzhls.at/blob/ldb/f/6/d/6d53a963d574c9a7f0b493bfc82550b6b9648.pdf, Dec. 1, 2018, 23 Pages.

(Continued)

*Primary Examiner* — Glenn A. Auve
(74) *Attorney, Agent, or Firm* — Alleman Hall & Tuttle LLP

(57) ABSTRACT

Examples are disclosed that relate to computing devices and methods for authenticating a user. In one example, a method for authenticating a user at a computing device comprises activating a fingerprint reader integrated into a power key of the computing device, and activating a visual indicator at the power key to indicate a status of the fingerprint reader. Based at least in part on activating the fingerprint reader, a standby function of the power key is disabled. A fingerprint of the user is received via the fingerprint reader and used to authenticate the user. After authenticating the user, the visual (Continued)

indicator is deactivated and the standby function of the power key is re-enabled.

20 Claims, 11 Drawing Sheets

(56) References Cited

U.S. PATENT DOCUMENTS

| | | | |
|---|---|---|---|
| 9,836,592 B2 | 12/2017 | Huang et al. | |
| 10,089,512 B2 | 10/2018 | Cao et al. | |
| 10,275,586 B2 | 4/2019 | Zhang et al. | |
| 2004/0155752 A1* | 8/2004 | Radke | G06V 40/13 340/5.2 |
| 2012/0019356 A1* | 1/2012 | Gagneraud | G06F 21/32 340/5.32 |
| 2013/0298224 A1 | 11/2013 | Heilpern | |
| 2019/0087609 A1 | 3/2019 | Zhang | |
| 2020/0089859 A1* | 3/2020 | Guan | G06V 40/50 |
| 2021/0110016 A1* | 4/2021 | Kamepalli | G06K 7/06 |

FOREIGN PATENT DOCUMENTS

| | | |
|---|---|---|
| CN | 108573188 B | 10/2021 |
| EP | 3608809 A1 | 2/2020 |
| KR | 20070076317 A | 7/2007 |
| TW | 201931185 A | 8/2019 |
| WO | 2018195832 A1 | 11/2018 |
| WO | 2018209493 A1 | 11/2018 |

OTHER PUBLICATIONS

"Samsung Galaxy S10e Fingerprint Reader in the Power Button", Retrieved From: https://www.slashleaks.com/l/samsung galaxy-s10e-fingerprint-reader-in-the-power-button, Retrieved Date: Jan. 20, 2023, 2 Pages.

"Unlock your Pixel phone with your fingerprint", Retrieved From: https://support.google.com/pixelphone/answer/6285273?hl-en, Retrieved Date: Jan. 20, 2023, 3 Pages.

"Windows Hello biometric requirements", Retrieved from: https://learn.microsoft.com/en-us/windows-hardware/design/device-experiences/windows-hello-biometric-requirements, Nov. 9, 2020, 3 Pages.

"XPS 15 2-in-1 Setup and Specifications", Retrieved From: https://cdn.cnetcontent.com/syndication/mediaserverredirect/0035c8d391aea340adef6c47ab66081a/original.pdf, Jul. 1, 2018, 22 Pages.

Bohn, Dieter, "Apple MacBook Air (2019) review: the new normal", Retrieved from: https://www.theverge.com/2019/7/17/20696457/apple-macbook-air-2019-review-default-macos-touchid-true-tone-price, Jul. 17, 2019, 10 Pages.

Casey, Henry T., "Apple MacBook Air (2019) Review", Retrieved From: https://www.laptopmag.com/reviews/laptops/apple-macbook-air-2019, Jul. 20, 2021, 24 Pages.

Gartenberg, et al., "Fingerprint-reading power buttons make securely booting up a seamless process", Retrieved from: https://www.theverge.com/circuitbreaker/2019/11/18/20967162/fingerprint-reading-power-button-apple-touch-id-macbook-pro-dell-huawei, Nov. 18, 2019, 6 Pages.

Kellen, et al., "Forget Home Button Fingerprint Scanners, It's All About Power Button and Rear Placements", Retrieved from: https://www.droid-life.com/2015/10/13/forget-home-button-fingerprint-scanners-its-all-about-power-button-and-rear-placements/, Oct. 13, 2015, 5 Pages.

Lowry, Brendan, "Does LG gram 17's camera support Windows Hello?", Retrieved From: https://www.windowscentral.com/does-lg-gram-17s-camera-support-windows-hello, Feb. 28, 2020, 8 Pages.

"Search Report Issued in Netherlands Patent Application No. N2025868", Mailed Date: Apr. 1, 2021, 10 Pages.

"International Search Report and Written Opinion Issued in PCT Application No. PCT/US21/070672", Mailed Date: Oct. 14, 2021, 12 Pages.

Perala, Alex, "Huawei Notebook Features Goodix Fingerprint Sensor in Power Button", Retrieved From: https://mobileidworld.com/archive/notebook-goodix-fingerprint-sensor-005231/, May 24, 2017, 5 Pages.

Satran, et al., "Windows Biometric Framework", Retrieved From: https://learn.microsoft.com/en-us/windows/win32/secbiomet/biometric-service-api-portal, Aug. 24, 2019, 1 Page.

* cited by examiner

POWER KEY AND FINGERPRINT READER

CROSS REFERENCE TO RELATED APPLICATIONS

The present application is a U.S. National Phase of International Patent Application Serial No. PCT/US2021/070672, filed Jun. 8, 2021, which claims priority to Netherlands Patent Application Serial No. 2025868, filed Jun. 19, 2020, the entire contents of each of which are hereby incorporated by reference for all purposes.

BACKGROUND

Some computing devices include one or more user authentication mechanisms to confirm a user's authenticity, such as password entry, facial recognition, and/or fingerprint-based authentication mechanisms. A combined power key and fingerprint reader may allow a user to access a computing device in a fast and fluid manner. However, it may be difficult for the user to know how the combined power key and fingerprint reader will behave in different use case scenarios.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to computing devices and methods for authenticating a user. In one example, a method for authenticating a user at a computing device comprises activating a fingerprint reader integrated into a power key of the computing device, and activating a visual indicator at the power key to indicate a status of the fingerprint reader. Based at least in part on activating the fingerprint reader, a standby function of the power key is disabled. A fingerprint of the user is received via the fingerprint reader and used to authenticate the user. After authenticating the user, the visual indicator is deactivated and the standby function of the power key is re-enabled.

DETAILED DESCRIPTION

Figure 1:
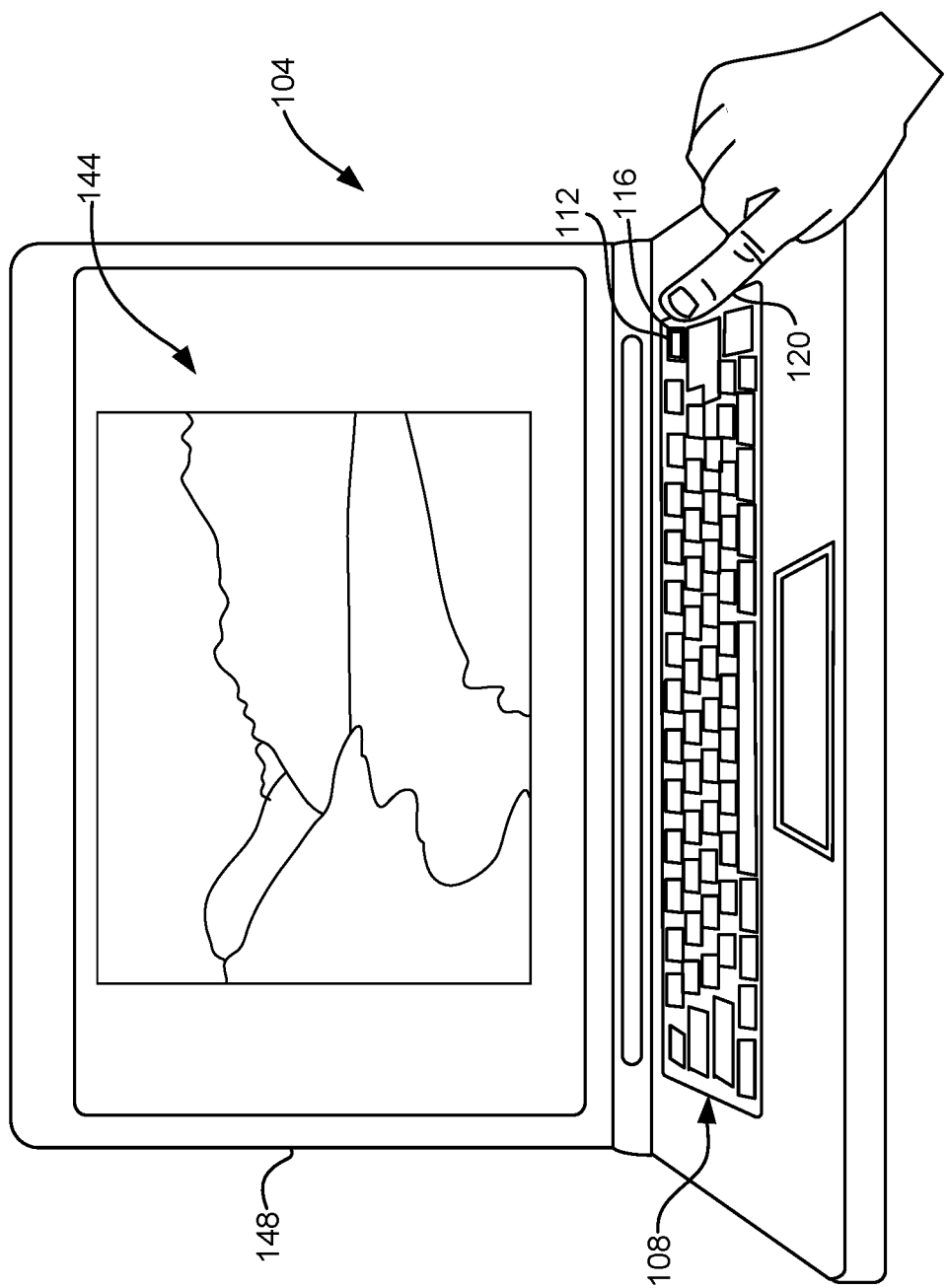
FIG. 1 shows one example of a computing device in the form of a laptop computing device according to examples of the present disclosure.

Some computing devices include one or more user authentication mechanisms to confirm a user's authenticity. For example, a computing device may use a password or PIN-based authentication mechanism to authenticate a user. In other examples, the computing device may use one or more facial recognition, fingerprint recognition, or other biometric mechanisms to authenticate the user.

User authentication mechanisms that provide quick, reliable and intuitive paths to authentication are desirable. In many cases, users expect to power-up and log into a secured computing device as quickly as possible, and in a manner that provides a pleasing and unobtrusive user experience. In some examples, a combined power key and fingerprint reader may allow the user to access the computing device in a fast and fluid manner. However, it may be difficult for the user to know how the combined power key and fingerprint reader will behave in different use cases, system states and modes of operation.

In some examples, users may not be aware that a computing device includes a fingerprint reader, or where it is located. When a device includes a combined power key/fingerprint reader, a user may not know if their fingerprint will be registered by simply resting a finger on the power key or if their fingerprint will be registered by actuating the power key. In some cases, users may find it difficult to learn how to use the fingerprint reader and may not be confident that they are using it correctly each time. Users also may expect a combined power key and fingerprint reader to behave the same way as a standalone power key, such as to force a computing device into a hard shutdown, regardless of whether the fingerprint reader is active. In other examples, users may expect that actuating the power key in the process of using the fingerprint reader will not put the computing device to sleep or shut down the computing device.

Accordingly, examples are disclosed that relate to computing devices and methods for authenticating a user that utilize a combined power key and fingerprint reader and user interface behaviors to provide fast, intuitive and pleasing user experiences. In one example, a method for authenticating a user at a computing device comprises activating a fingerprint reader integrated into a power key of the computing device, and activating a visual indicator at the power key to indicate a status of the fingerprint reader. As explained in more detail below, based at least in part on activating the fingerprint reader, a standby function of the power key is disabled. A fingerprint of the user is then received via the fingerprint reader and used to authenticate the user. After authenticating the user, the visual indicator is deactivated and the standby function of the power key is re-enabled.

As described in more detail below, the devices and methods disclosed herein may provide contextual and helpful visual cues for the behavior of a combined fingerprint reader and power key. In this manner, the behavior of the fingerprint reader and power key may be simplified and made more predictable, thereby facilitating user learning of the key's functionality.

With reference now to FIG. 1, one example of a computing device is illustrated in the form of a laptop computing device 104. In other examples, the computing device may take the form of a desktop computing device, tablet computing device, smartphone, or any other suitable computing device. As illustrated by example in FIG. 1, the laptop computing device 104 includes a keyboard 108. In some examples, the keyboard 108 is integrated into a body of the laptop computing device 104. In other examples, the keyboard 108 may comprise a peripheral device.

The laptop computing device 104 also includes a power key 112. The power key 112 may be positioned at any suitable location. For example, the power key 112 may be located on the keyboard 108 as shown in FIG. 1, or may be in other locations on the device. In some examples, the power key 112 may have a visual appearance and provide an actuation experience that is similar to other keys on the keyboard 108. For example, the power key 112 may comprise a keycap with similar construction and iconography to the other keys. In other examples, the power key 112 may have one or more visual, tactile, or other properties that distinguish the power key 112 from the rest of the keyboard 108.

The laptop computing device 104 also includes a fingerprint reader 116 that is integrated into the power key 112. In some examples, the fingerprint reader 116 is an optical fingerprint reader, in which an image sensor within or below the power key 112 may generate an image of the surface of a user's finger that is contacting the key. The laptop computing device 104 may analyze the image to compare one or more features of the user's fingerprint (e.g. a pattern of ridges and valleys on the surface of the user's finger) to one or more registered fingerprints stored on the laptop computing device 104 or in a remote storage device. In other examples, the fingerprint reader 116 may comprise a capacitive fingerprint reader, an ultrasound fingerprint reader, a thermal fingerprint reader, or any other suitable fingerprint reading technology. In this manner, the laptop computing device 104 may use a fingerprint of the user as a credential to authenticate the user in a fast and fluid manner.

In some examples, the fingerprint reader 116 may support one or more authentication components of an operating system of the laptop computing device 104. For example, the fingerprint reader 116 may be compliant with FIDO2 security specifications. In some examples, the fingerprint reader 116 may have a false acceptance rate of less than 0.002% and a false acceptance rate of antispoofing or liveness detection of less than 10%. In other examples, it may be desirable for the fingerprint reader 116 to have a false acceptance rate of less than 0.001% and a false acceptance rate of antispoofing or liveness detection of less than 5%.

The fingerprint reader 116 may be inactive until the laptop computing device 104 prompts a user for authentication. For example, the power key 112 may function as a basic power button and operate according to a first set of behaviors until the laptop computing device 104 prompts a user for authentication, such as to allow the user to sign into a user account. The fingerprint reader 116 is then activated to authenticate the user. Additionally and as described in more detail below, when the fingerprint reader 116 is activated the power key 112 operates according to a second set of behaviors that differ in some respects from the first set of behaviors. Advantageously, these modified power key behaviors facilitate a natural and intuitive user experience with the combined fingerprint reader and power key. Further and as described below, when the fingerprint reader is activated a visual indicator at the power key is also activated to alert the user and direct her attention to the fingerprint reader.

The laptop computing device 104 also comprises a processor and a memory storing instructions executable by the processor to manage behaviors of the power key 112 and operation of the fingerprint reader 116 and visual indicator as described herein. The laptop computing device 104 may additionally include a communication subsystem configured to provide telemetry data to one or more other computing devices. For example, the laptop computing device 104 may self-host a telemetry client configured to capture data and transmit the data to a remote computing device over the Internet. Some suitable examples of data that may be captured and transmitted include fingerprint usage (e.g. regular fingerprint usage and one-time fingerprint usage), authentication quality (e.g. false acceptance rate), authentication performance (e.g. time to authenticate), and an authentication mode (e.g. whether the power button is actuated in the process of reading a user's fingerprint).

In some examples, the telemetry client may prioritize one or more such parameters over others. For example, the telemetry client may prioritize the fingerprint usage and the authentication quality over the authentication performance and the authentication mode. Additional details regarding the components and computing aspects of the laptop computing device 104 are described in more detail below with reference to FIG. 11.

Additionally, and as noted above, in some cases it may be difficult for a user to know when a fingerprint reader is active and/or how a combined fingerprint reader and power key will behave. Accordingly, and with reference now to FIGS. 2-4, the laptop computing device 104 includes a visual indicator at the power key 112. The visual indicator is selectively controlled to indicate a status of the fingerprint reader 116. As described in more detail below, the visual indicator may provide helpful and contextual visual cues for the behavior of the combined fingerprint reader 116 and the power key 112.

Figure 2:
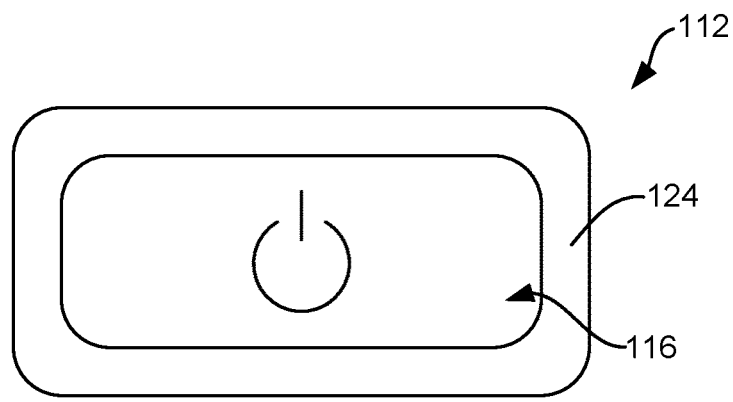
FIG. 2 shows one example of a power key including a fingerprint reader and a visual indicator at the power key according to examples of the present disclosure.
Figure 3:
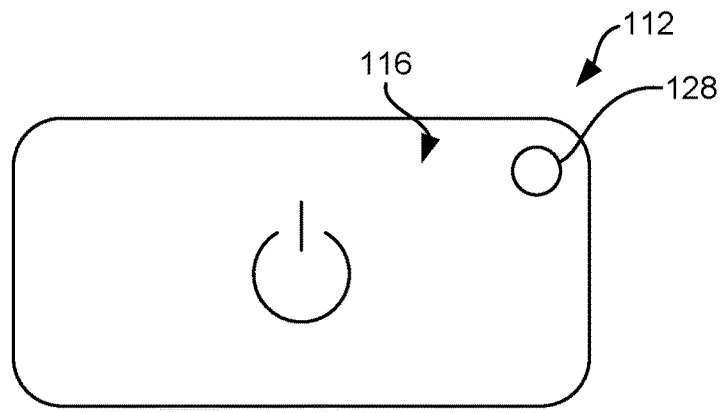
FIG. 3 shows another example of a power key including a fingerprint reader and a visual indicator at the power key according to examples of the present disclosure.

As illustrated by example in FIG. 2, the visual indicator may take the form of a ring 124 extending around the power key 112. The ring 124 may comprise an integrated light source, such as an LED, or may be illuminated by a light source spaced from the ring to indicate a status of the fingerprint reader 116. The light source may comprise a single-color light source (e.g. a white LED or a blue LED), or the light source may comprise a multicolor or a variable color light. In some examples, the light source may illuminate with different colors that are tied to different contextual states.

In some examples, the light source is illuminated only when the fingerprint reader 116 is active (e.g., operational to sense a fingerprint) and extinguished when the fingerprint reader 116 is not active. In some examples, the light source may illuminate when the laptop computing device 104 prompts a user for authentication (e.g., requests the user touch the fingerprint reader 116) and remain off at other times. In some examples, the fingerprint reader 116 may be activated after the light source is illuminated and when a user's finger contacts the surface of the power key 112.

In the above examples, the light source is illuminated for the sole purpose(s) of prompting the user to authenticate and/or indicating that the fingerprint reader 116 is active. Correspondingly, the light source is never illuminated to indicate a power state or any other system states of the computing device. In some examples, when illuminated the light source is illuminated at a constant brightness/intensity, and does not turn off, blink, or change color. In this manner and as described in more detail below, the light source may provide clear visual cues to communicate the status of the fingerprint reader 116, which also advantageously facilitates user learning of the power key's different functionality during fingerprint authentication. In other examples, the light source may change color, blink, visually adapt, or change in any other suitable manner to indicate a status of the fingerprint reader 116.

In some examples and as shown in FIG. 2, the ring 124 may be integrally formed with the power key 112 to form a single component. In other examples, the ring 124 may be a separate component from the power key 112. In other examples and with reference to FIG. 3, the visual indicator takes the form of a point light source 128 that is integrated into the power key 112. The point light source 128 may comprise an individual LED or another suitable point light source.

In other examples, the visual indicator is not integrated into the power key 112 and is located on a body of the laptop computing device 104 adjacent to or otherwise near to the power key 112. For example, in FIG. 4A the point light source 132 is not a part of the power key 112 and is positioned adjacent to the power key 112.

Figure 4A:
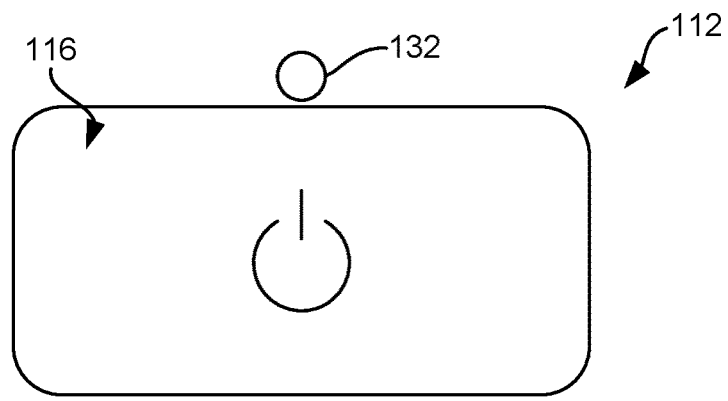
FIG. 4A shows yet another example of a power key including a fingerprint reader and a visual indicator at the power key according to examples of the present disclosure.
Figure 4B:
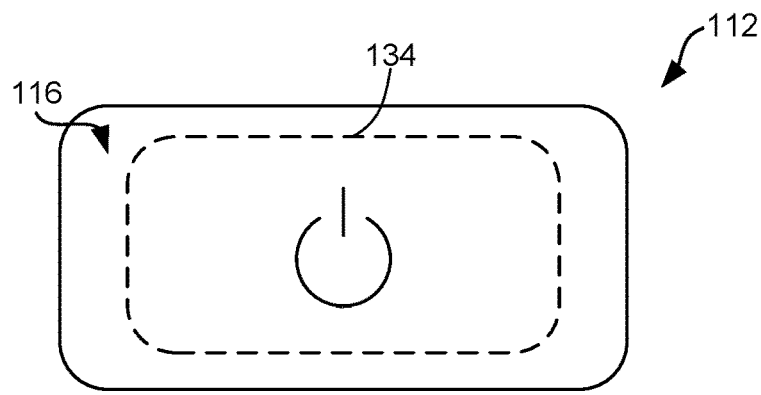
FIG. 4B shows yet another example of a power key including a fingerprint reader and a visual indicator at the power key according to examples of the present disclosure.

In yet other examples, the visual indicator may comprise a display, a glyph, or a symbol. As illustrated in FIG. 4B, in one example the power key 112 includes an integrated display 134, such as an LCD. The integrated display 134 may selectively display suitable imagery, such as graphics, animations, text, or colors, to indicate a status of the fingerprint reader 116. For example, the integrated display 134 may display an image when the fingerprint reader 116 is activated to prompt a user to provide a fingerprint.

Figure 4C:
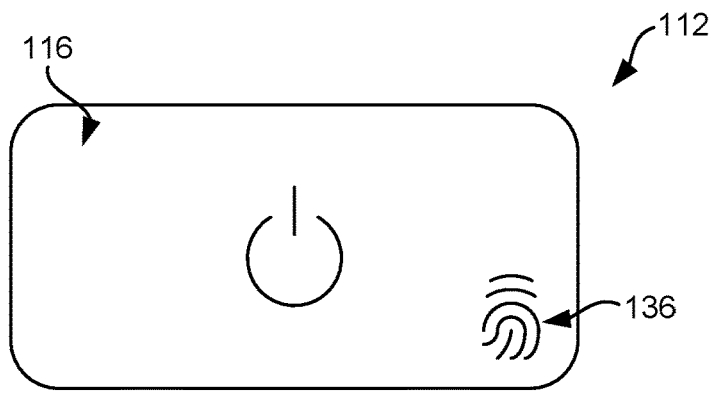
FIG. 4C shows yet another example of a power key including a fingerprint reader and a visual indicator at the power key according to examples of the present disclosure.

In another example shown in FIG. 4C, the power key 112 includes a glyph 136 that represents a fingerprint. The glyph 136 may indicate that the power key 112 includes the integrated fingerprint reader 116. In some examples, the glyph 136 functions as a visual indicator as described herein and appears or illuminates on the power key 112 to prompt the user to authenticate and/or indicate that the fingerprint reader 116 is active.

Figure 4D:
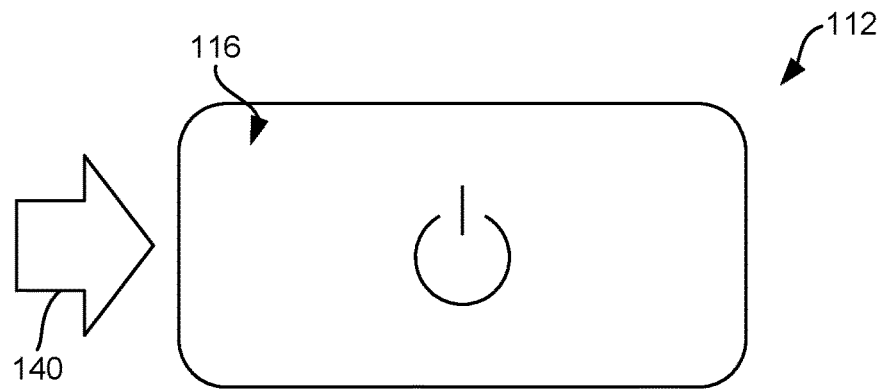
FIG. 4D shows yet another example of a power key including a fingerprint reader and a visual indicator at the power key according to examples of the present disclosure.

In other examples and with reference to FIG. 4D, the visual indicator may comprise an arrow 140 pointing to the power key 112. The arrow 140 is located on the keyboard 108 of the laptop computing device 104 of FIG. 1. Like the glyph 136 on the power key 112, the arrow 140 may be illuminated or may appear (e.g. on a display or projected onto the keyboard 108) to indicate that the fingerprint reader 116 is active. It will also be appreciated that other configurations of visual indicators that are integrated into or located adjacent to or otherwise near the power key 112 may be utilized.

The behavior of the visual indicator is controlled by the laptop computing device 104. For example, the visual indicator may be activated, deactivated, or configured in any other suitable manner by software, hardware, and/or firmware components of the laptop computing device 104. The behavior of the visual indicator may be defined by firmware and a driver implementing the processes described herein. In addition, the laptop computing device 104 controls the behavior of the power key 112 to provide expected behavior when the visual indicator is active.

Figure 5:
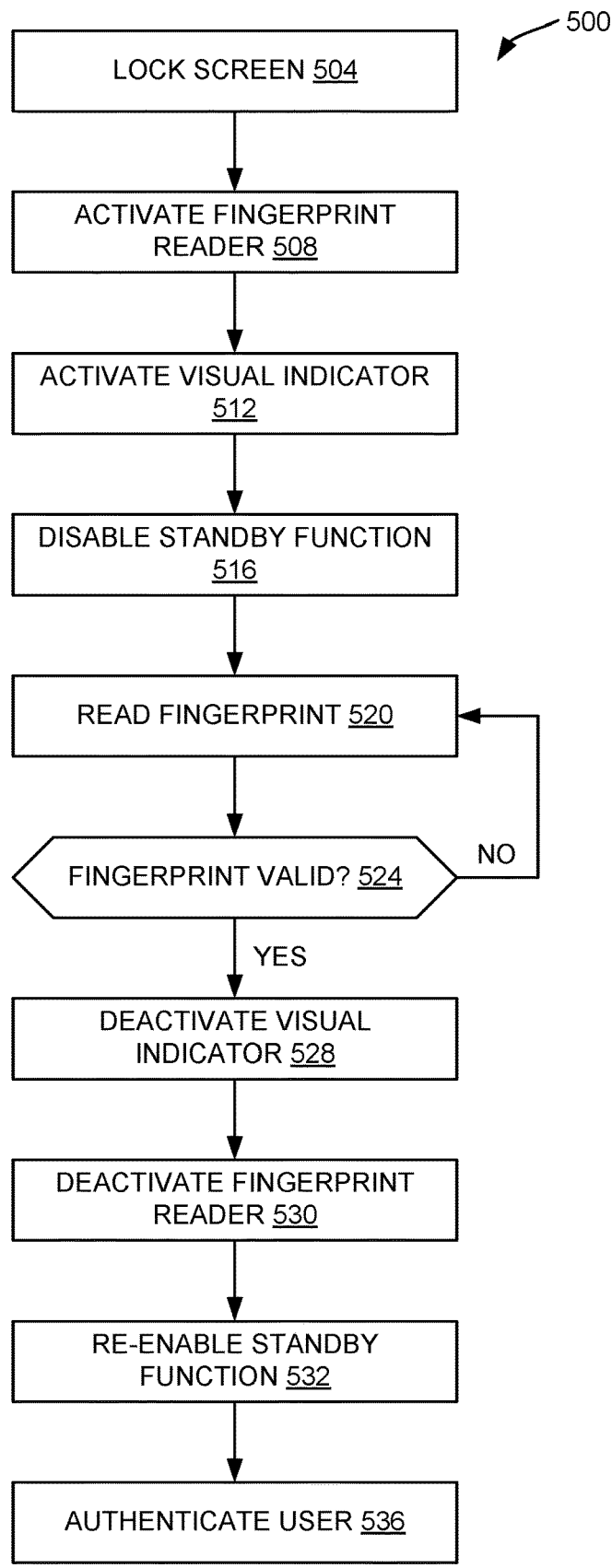
FIG. 5 shows a flow diagram of an example method for using a combined power key and fingerprint reader to authenticate a user for a computing device according to examples of the present disclosure.

For example, and with reference now to FIG. 5, a flow diagram is illustrated depicting an example method 500 for using a combined power key and fingerprint reader to authenticate a user, including using a visual indicator to indicate a status of the fingerprint reader. The following description of method 500 is provided with reference to the software and hardware components described herein and shown in FIGS. 1-4 and 6-11. For example, the method 500 may be performed by the laptop computing device 104 of FIG. 1, hardware, software, or firmware of the laptop computing device 104, or some suitable combination of components described herein.

It will be appreciated that the following description of method 500 is provided by way of example and is not meant to be limiting. Therefore, it is to be understood that method 500 may include additional and/or alternative steps relative to those illustrated in FIG. 5. Further, it is to be understood that method 500 may be performed in any suitable order. Further still, it is to be understood that one or more steps may be omitted from method 500 without departing from the scope of this disclosure. It will also be appreciated that method 500 also may be performed in other contexts using other suitable components.

As indicated at 504, the method 500 includes displaying a lock screen via a display of a computing device. In the example of FIG. 5, the computing device is in a power-on state and is locked at step 504. FIG. 1 shows one example of a lock screen 144 displayed by the laptop computing device 104. The lock screen 144 is displayed when the laptop computing device 104 is in a power-on state and is locked. In some examples, the lock screen 144 is displayed when the laptop computing device 104 is powered on from a power-off state, or when the laptop computing device 104 is awakened from a sleep mode, but before a user logs in. In other examples, the lock screen 144 may be displayed when a user locks the laptop computing device 104 manually (e.g. via a command to lock), or when a threshold period of time passes without any user activity. As described below, when the lock screen 144 is displayed the visual indicator at the power key 112 is also displayed to prompt and guide the user to the fingerprint reader 116 integrated into the power key 112 to unlock the computing device.

With reference again to FIG. 5, to authenticate the user, at 508 the method 500 includes activating the fingerprint reader integrated into the power key. At 512, the method 500 includes activating the visual indicator at the power key to indicate the status of the fingerprint reader as being active. In some examples, the visual indicator is activated whenever the lock screen is displayed. In some examples, the visual indicator is activated in response to the computing device powering on or in response to waking from a sleep mode. In other examples, the visual indicator is displayed during the initial out-of-box experience to show the user where the fingerprint reader is located. In these examples, the visual indicator may remain illuminated during a fingerprint enrollment process to store the user's fingerprint, and is extinguished upon completion of the enrollment process.

At 516, the method 500 includes disabling a standby function of the power key. As described further below, the standby function of the power key operates to transition the computing device into a standby mode that comprises a sleep mode or a suspend-to-RAM mode. In the standby mode or sleep mode, an operational state of the computing device is saved (e.g. in RAM). Power continues to be supplied to the RAM and/or other storage devices, while other systems are powered off. In this manner, the computing device may consume less power while in standby mode. Furthermore, upon resuming use of the computing device, a user may avoid reissuing instructions or waiting for the computing device to reboot.

Returning to 516, and in one potential advantage of the present disclosure, the standby function of the power key is disabled whenever the fingerprint reader is active. In some examples, activating the fingerprint reader and/or illuminating the visual indicator triggers disabling the standby function of the power key. In this manner, and as described in more detail below with reference to FIG. 6, the power key may operate according to a first set of behaviors (in which the standby function is active) until the fingerprint reader is active. When the fingerprint reader is active, the power key operates according to a second set of behaviors in which the standby function is disabled.

Advantageously, by disabling the standby function of the power key when the fingerprint reader is active, a user may press and actuate the power key in the process of using the fingerprint reader without putting the computing device in a standby mode. Furthermore, as the visual indicator is also illuminated whenever the fingerprint reader is active, the behavior of the visual indicator is tied to the behavior of the power key in a predictable and easily-learned manner. That is, the user quickly learns that when the visual indicator is illuminated, the standby function of the power key is disabled. This consistent behavior of the visual indicator provides clear visual feedback to the user that the standby function of the power key is disabled whenever the fingerprint reader is active. In this manner, activating the visual indicator increases user confidence that it is safe to press and actuate the power key in the process of using the fingerprint reader without placing the computing device in standby mode.

Returning to FIG. 5, at 520, the method 500 includes reading a fingerprint of a user. The fingerprint is read using the fingerprint reader 116 of FIG. 1. In some examples, and with reference again to FIG. 1, the fingerprint may be captured while the user's finger 120 touches the fingerprint reader 116 without actuating the power key 112. In other examples, the fingerprint may be captured when the user presses and actuates the power key 112.

At 524, the method 500 includes determining whether the fingerprint captured at 520 is valid. For example, the fingerprint may be compared to a fingerprint of an authorized user or another suitable credential stored on the computing device to determine if the fingerprint belongs to an authorized user. For example, the fingerprint may be compared to a fingerprint associated with a user account to determine if the user is authorized to log into that user account. In some examples, when it is determined that the fingerprint is not valid, the method 500 may include returning to step 520. In this manner, the computing device may continue attempting to read the fingerprint at step 520 for a predetermined time period. If the time period expires before the fingerprint is validated, the computing device may return to a lock screen.

In other examples when it is determined that the fingerprint is valid, at 528 the method 500 includes deactivating the visual indicator. At 530 the method 500 also includes deactivating the fingerprint reader. At 532, and in conjunction with deactivating the fingerprint reader and visual indicator, the method 500 includes re-enabling the standby function of the power key. In some examples, the visual indicator may be deactivated at the same time as the standby function is re-enabled. For example, if the fingerprint matches a valid credential of an authorized user, an LED of the visual indicator may be turned off and the standby function of the power key re-enabled.

As described in more detail below with reference to FIG. 6, the power key may resume operating according to the first set of behaviors after re-enabling the standby function of the power key at 532. For example, and after re-enabling the standby function of the power key, the computing device may be placed in a sleep mode in response to sensing a depression and release of the power key within a threshold period.

At 536, and based on validating the fingerprint of the user, the method 500 includes authenticating the user. In some examples, authenticating the user may comprise granting the user access to a desktop. In other examples, and as described in more detail below, authenticating the user may comprise logging into an operating system after booting the computing device from a power-off state, unlocking the computing device after waking from a standby mode, or authenticating the user for an application. In some examples, the user may be authenticated within approximately 750 ms of determining that the fingerprint is valid. In other examples, it may be desirable to authenticate the user in less than 500 ms after determining that the fingerprint is valid.

Figure 6:
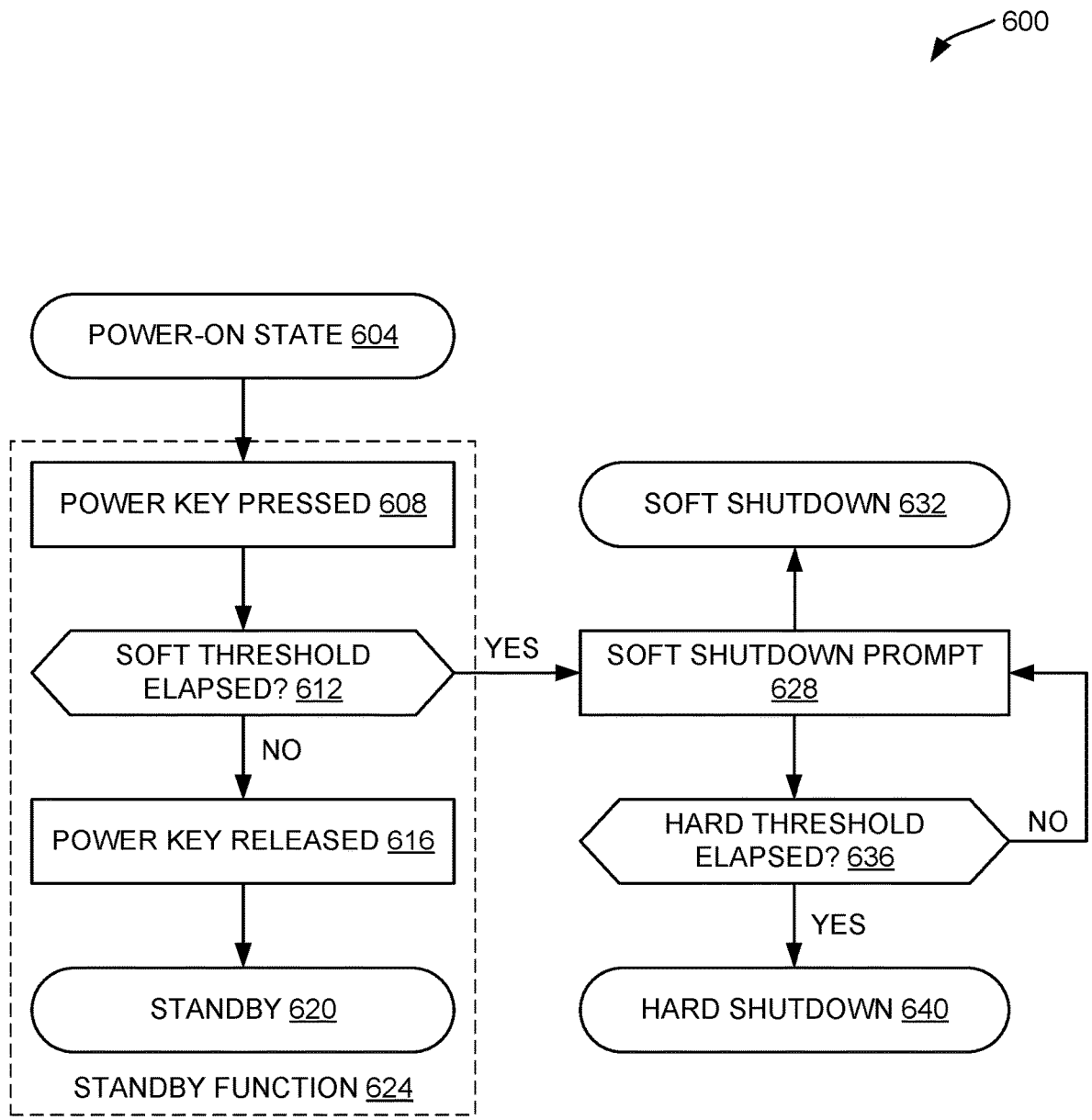
FIG. 6 shows a flow diagram of an example method for using a power key to control a power state of a computing device according to examples of the present disclosure.

With reference now to FIG. 6, a flow diagram is illustrated depicting an example method 600 for using a power key to control a power state of a computing device. The following description of FIG. 6 is provided with reference to the software and hardware components described herein and shown in FIGS. 1-5 and 7-11. For example, the power key described below may comprise the power key 112 of FIG. 1, and the power key behaviors may comprise actions performed by the laptop computing device 104 of FIG. 1 and/or a system user interface of the laptop computing device 104 based at least upon actuation or de-actuation of the power key 112.

It will be appreciated that following description of method 600 is provided by way of example and is not meant to be limiting. Therefore, it is to be understood that method 600 may include additional and/or alternative steps relative to those illustrated in FIG. 6. Further, it is to be understood that method 600 may be performed in any suitable order. Further still, it is to be understood that one or more steps may be omitted from method 600 without departing from the scope of this disclosure. It will also be appreciated that method 600 also may be performed in other contexts using other suitable components.

As indicated at 604, the power key may be used to control a computing device that is in a power-on state. At 608, the method 600 includes pressing the power key. In some examples, pressing the power key comprises pressing and actuating the power key beyond a key make threshold. For example, pressing and actuating the power key beyond the key make threshold can close a circuit directly, capacitively or in another suitable manner.

At 612, the method 600 comprises, after pressing the power key, determining whether a predefined first threshold timeframe has elapsed while the key is depressed. The predefined first threshold timeframe may comprise any suitable time, such as 4 seconds. In some examples, the predefined first threshold timeframe may be adjustable.

At 616, the method 600 may include releasing the power key before the predefined first threshold timeframe has elapsed. In some examples, releasing the power key comprises a user lifting and de-actuating the power key beyond a key break threshold. For example, de-actuating the power key beyond the key break threshold may comprise opening a circuit directly, capacitively or in another suitable manner. In some examples, a debounce time in which one actuation/de-actuation of the power key is registered may be adjustable. When the power key is depressed for a timeframe less than the predefined first threshold timeframe, at 620, the method 600 comprises placing the computing device in a standby mode.

In some examples, steps 608-620 may be referred to as a standby function 624 of the power key. In other words, when the computing device is in a power-on state and the fingerprint reader is inactive, operating the power key as described in steps 608-616 places the computing device in a standby mode at 620. Further and as described above, by disabling the standby function of the power key when the fingerprint reader is active, a user may be allowed to depress and actuate the power key in the process of using the fingerprint reader without putting the computing device to sleep. Subsequently, and after re-enabling the standby function of the power key, as introduced above, the computing device may be placed in a standby mode in response to sensing that the power key is depressed for a timeframe less than the predefined first threshold timeframe.

Returning to FIG. 6 and at 628, when the power key is depressed for a timeframe greater than the predefined first threshold timeframe, the method 600 includes providing a predefined first shutdown prompt. For example, the laptop computing device 104 of FIG. 1 may provide a predefined first shutdown prompt when the power key 112 is depressed for longer than a predefined first threshold timeframe of 4 seconds. The predefined first shutdown prompt may take any suitable form, such as displaying a graphical user interface query to the user.

At 632, the method 600 includes initiating a soft shutdown. For example, a user may accept the soft shutdown prompt, such as by interacting with the graphical user interface, to shut down the computing device. In the soft shutdown, power is removed in a controlled manner from components of the computing device. In contrast to the sleep mode, the computing device may not save its operational state. Furthermore, while power may continue to be supplied to the RAM and/or other storage devices in the sleep mode, these components may be powered off after the soft shutdown.

In some examples, the soft shutdown may include placing the computing device in a hibernation mode. In a hibernation mode, an operational state of the computing device may be saved to a hard disk or other non-volatile storage device prior to powering off the computing device. In this manner, the operational state of the computing device may be preserved without consuming any power while the computing device is shut down. When the computing device is subsequently powered on, the computing device may resume operating from the saved operational state.

At 636, the method 600 includes determining whether a predefined second threshold timeframe has elapsed. The predefined second threshold timeframe may be longer than the predefined first threshold timeframe. The predefined second threshold timeframe may comprise any suitable time, such as 10 seconds. In some examples, the predefined second threshold timeframe may be adjustable. The predefined second threshold timeframe may be adjustable separately from the predefined first threshold timeframe. In other examples, the predefined second threshold timeframe may vary between different circumstances. For example, the predefined second threshold timeframe may be longer when the computing device is logged into a user account than when the computing device is not logged in, or when the computing device is locked.

As illustrated by example in FIG. 6, when the power key is depressed for a timeframe that is greater than the predefined first threshold timeframe and less than the predefined second threshold timeframe, the computing device provides the soft shutdown prompt at 628. When the power key is depressed for a timeframe that is greater than the predefined second threshold timeframe, the method 600 includes initiating a hard shutdown at 640. The hard shutdown may be comparable to a power cut. For example, and in contrast to the soft shutdown, power may be interrupted in such a manner as to forcibly shut down the computing device. Furthermore, the hard shutdown does not allow the computing device to save its operational state, and thus does not result in hibernation. Forcibly shutting down the computing device may be desirable, for example, when an error is encountered that may be difficult to resolve in any other manner.

In some examples, both the soft shutdown 632 operation and the hard shutdown 640 operation are available when the fingerprint reader is not active and the visual indicator is not illuminated, and also when the visual indicator is illuminated and the fingerprint reader is active. In this manner, and in one potential advantage of the present disclosure, this power key behavior is consistent and unchanging across all states and modes of the computing device, including the fingerprint authentication processes described herein. Accordingly, the user can place the computing device in soft shutdown or hard shutdown (power off) modes by executing the same key behaviors regardless of the state/mode of the computing device. This provides a consistent, pleasing and easily-learned user experience.

Figure 7:
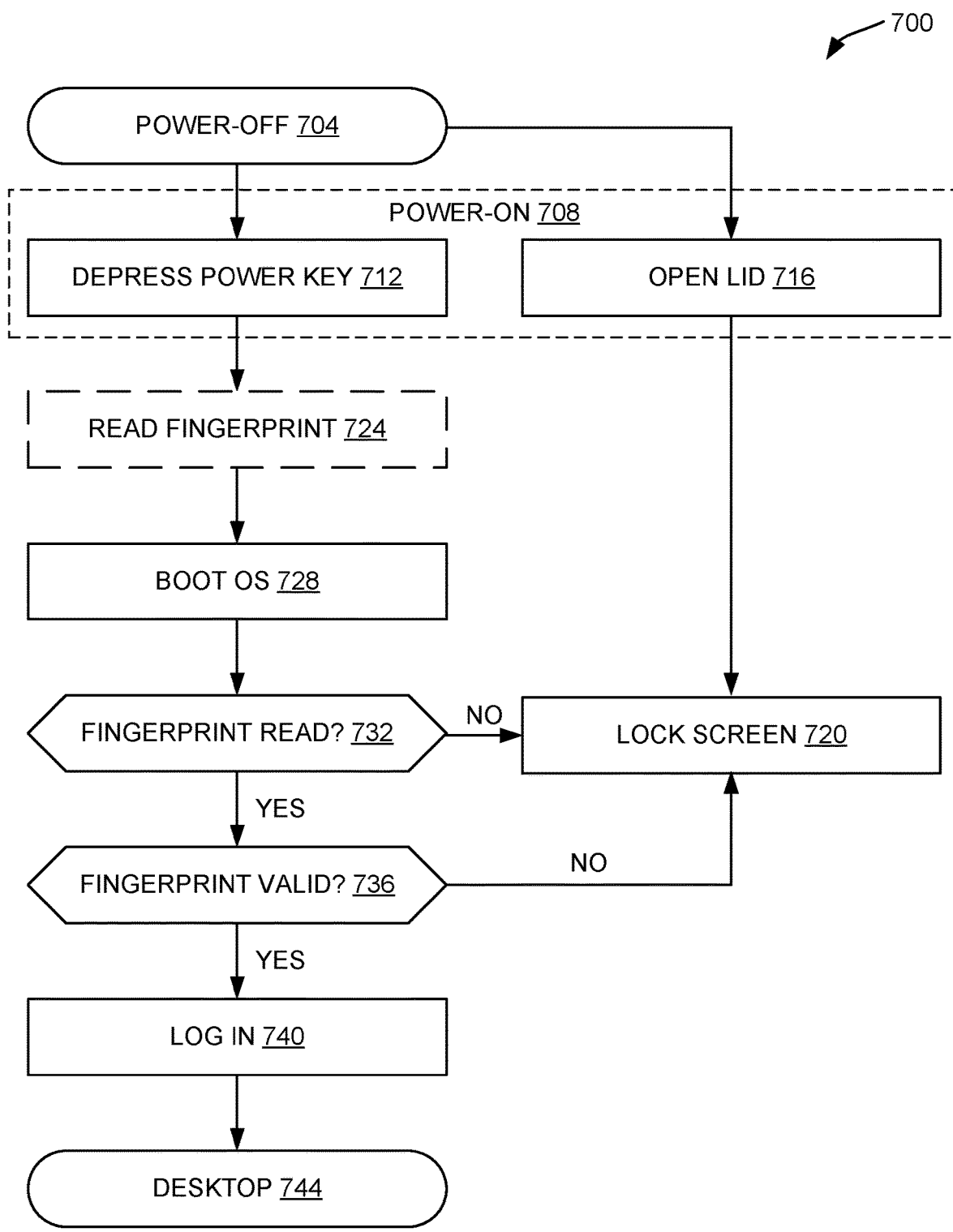
FIG. 7 shows a flow diagram of another example method for using a combined power key and fingerprint reader to authenticate a user for a computing device according to examples of the present disclosure.

With reference now to FIG. 7, another example method 700 is illustrated for using a combined power key and fingerprint reader to authenticate a user for a computing device. In the example method 700, the computing device is initially in a power-off state. The following description of method 700 is provided with reference to the software and hardware components described herein and shown in FIGS. 1-6 and 8-11. It will be appreciated that following description of method 700 is provided by way of example and is not meant to be limiting. Therefore, it is to be understood that method 700 may include additional and/or alternative steps relative to those illustrated in FIG. 7. Further, it is to be understood that method 700 may be performed in any suitable order. Further still, it is to be understood that one or more steps may be omitted from method 700 without departing from the scope of this disclosure. It will also be appreciated that method 700 also may be performed in other contexts using other suitable components.

As indicated at 704, the computing device is initially in a power-off state, which may include hibernation. As described above, the visual indicator is not illuminated while the device is off or hibernating. At 708, the method 700 includes powering on the computing device from the power-off state. The computing device may be powered on in any suitable manner. For example, at 712, the method 700 may include powering on the computing device by depressing the power key. In another example, at 716, the method 700 may include powering on the computing device by opening a lid of the computing device. For example, the laptop computing device 104 of FIG. 1 may be powered on by either depressing the power key 112 or lifting a screen portion 148 of the laptop computing device 104 while the laptop computing device 104 is in a power-off state.

At 720, the method 700 may include displaying a lock screen. For example and as described above, the lock screen may comprise the lock screen 144 of FIG. 1. From the lock screen, a user of the computing device may proceed through the method 500 of FIG. 5 to authenticate themselves and log into the computing device.

In other examples, at 724, the method 700 may include reading a fingerprint of a user. As described above, reading the fingerprint of the user may include activating a fingerprint reader integrated into the power key, activating a visual indicator at the power key, and disabling a standby function of the power key. In some examples, reading the fingerprint of the user comprises reading the fingerprint at the same time as the user depresses the power key to power on the computing device. In such examples, the fingerprint reader may be activated for at least a short period of time after the computing device is powered on to capture the fingerprint of the user. In this manner, and as described in more detail below, the method 700 may allow a computing device to boot, authenticate the user, and log in with a single press of the power key.

In some examples, reading the fingerprint of the user may include enrolling a fingerprint of a new user. For example, step 708 may include powering-on the computing device for the first time. Upon powering-on the computing device, the user may be prompted to provide a fingerprint, which may become a registered fingerprint that is used to authenticate the user for future logins. In such examples, activating the visual indicator along with the fingerprint reader can provide the user with a clear indication that the fingerprint reader is active and ready to read the user's fingerprint, while also guiding the user to the location of the fingerprint reader.

Next, at 728, the method 700 may include booting the computing device into an operating system. It will be appreciated that booting into the operating system as described herein includes booting into the operating system from a hibernation state.

At 732 the method 700 includes determining whether a fingerprint of the user was previously read. For example, in some use cases the fingerprint of the user is read at the same time as the user depresses the power key to power on the computing device. In other use cases, the fingerprint reader is unable to read the fingerprint of the user when the user depresses the power key. When the fingerprint of the user was not previously read, the method 700 may include moving to step 720 and providing the lock screen. From the lock screen, the user may proceed through the method 500 of FIG. 5 to authenticate themselves and log into the computing device.

In other examples and at 736, when the fingerprint of the user was previously read, the method 700 includes determining whether the fingerprint is valid. Determining whether the fingerprint is valid may include comparing one or more features of the fingerprint to one or more registered fingerprints, as described above, to authenticate the user. When the fingerprint is not valid, the method 700 may include moving to step 720 and providing the lock screen. From the lock screen, the user may proceed through the method 500 of FIG. 5 to authenticate themselves and log into the computing device.

When the fingerprint of the user is valid, the method 700 includes, at 740, logging into the computing device after using the fingerprint to authenticate the user. In some examples, when it is determined that the fingerprint is valid, the fingerprint reader and the visual indicator are deactivated and the standby function of the power key may be re-enabled. In some examples and at 744, after logging into the computing device, the method 700 includes providing a desktop environment from which the user may access one or more applications and/or files.

Figure 8:
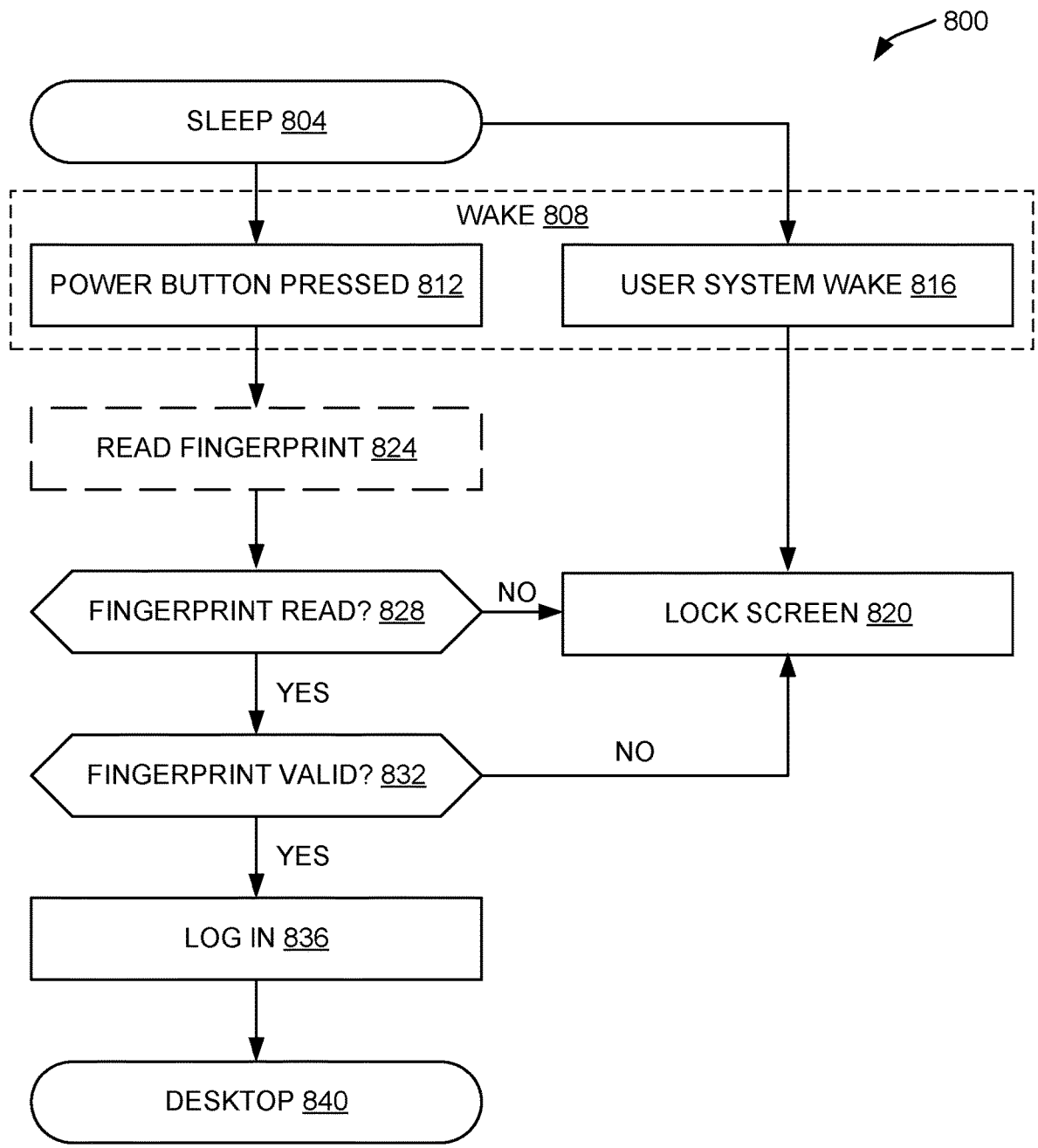
FIG. 8 shows a flow diagram of another example method for using a combined power key and fingerprint reader to authenticate a user for a computing device according to examples of the present disclosure.

With reference now to FIG. 8, another example method 800 is illustrated for using a combined power key and fingerprint reader to authenticate a user for a computing device. In the example method 800, the computing device is initially in a sleep mode. The following description of method 800 is provided with reference to the software and hardware components described herein and shown in FIGS. 1-7 and 9-11. It will be appreciated that following description of method 800 is provided by way of example and is not meant to be limiting. Therefore, it is to be understood that method 800 may include additional and/or alternative steps relative to those illustrated in FIG. 8. Further, it is to be understood that method 800 may be performed in any suitable order. Further still, it is to be understood that one or more steps may be omitted from method 800 without departing from the scope of this disclosure. It will also be appreciated that method 800 also may be performed in other contexts using other suitable components.

As indicated at 804, the computing device is initially in a sleep mode. While the computing device is in the sleep mode, the visual indicator is not illuminated. At 808, the method 800 includes waking the computing device from the sleep mode. The computing device may be woken in any suitable manner. For example, at 812, the method 800 comprises waking the computing device by depressing the power key. In another example, at 816, the method 800 may include waking the computing device via a user system. For example, the laptop computing device 104 of FIG. 1 may be asleep with the screen portion 148 closed against the keyboard. In such examples, the laptop computing device 104 may be awakened from sleep mode by opening the screen portion 148. In other examples, the laptop computing device 104 may be asleep with the screen portion 148 open. In such examples, the user may wake the laptop computing device 104 by providing any suitable user input, such as by pressing any key on the keyboard 108.

At 820, the method 800 includes providing a lock screen. For example, and as described above with reference to FIG. 5, the lock screen may comprise the lock screen 144 of FIG. 1. From the lock screen, a user of the computing device may proceed through the method 500 of FIG. 5 to authenticate themselves and log into the computing device.

In other examples, at 824, the method 800 may include reading a fingerprint of a user. In some examples, reading the fingerprint of the user comprises reading the fingerprint at the same time as the user depresses the power key to wake the computing device. In such examples, the fingerprint reader may be activated for at least a short period of time to capture the fingerprint of the user. In this manner, the method 800 may allow a computing device to wake and authenticate the user with a single press of the power key.

At 828 the method 800 includes determining whether a fingerprint of the user was previously read. As described above, in some use cases the fingerprint of the user is read at the same time as the user depresses the power key to power on the computing device. In other use cases, the fingerprint reader is unable to read the fingerprint of the user when the user depresses the power key. When the fingerprint of the user was not previously read, the method 800 may include moving to step 820 and providing the lock screen.

In other examples and at 832, when the fingerprint of the user was previously read, the method 800 includes determining whether the fingerprint is valid. Determining whether the fingerprint is valid may include comparing one or more features of the fingerprint to one or more registered fingerprints, as described above, to authenticate the user. When the fingerprint is not valid, the method 800 may include moving to step 820 and providing the lock screen.

When the fingerprint of the user is valid, the method 800 includes, at 836, logging into the computing device after using the fingerprint to authenticate the user. In some examples, logging into the computing device results in providing a desktop environment at 840, from which the user may access one or more applications and/or files.

In some examples, the computing device may be logged into the desktop environment within 1 second of waking at 808. In other examples, the computing device may be logged into the desktop environment within 750 ms or 500 ms of waking. In some examples, such as when the fingerprint is not read, the lock screen may be provided within 100 ms of waking. In other examples, it may be desirable to provide the lock screen within 50 ms of waking.

Figure 9:
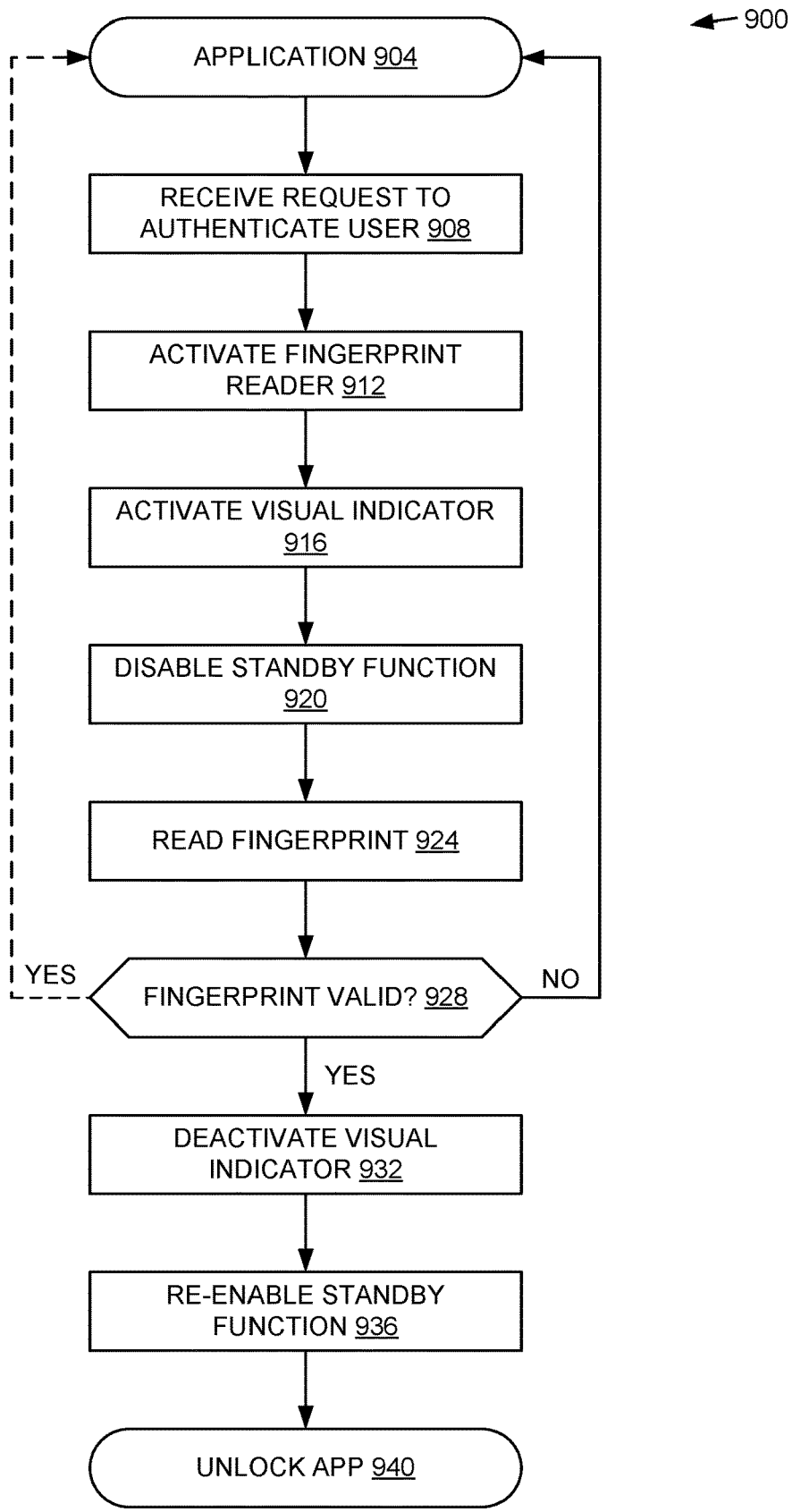
FIG. 9 shows a flow diagram of another example method for using a combined power key and fingerprint reader to authenticate a user for an application according to examples of the present disclosure.

With reference now to FIG. 9, an example method 900 is illustrated for using a combined power key and fingerprint reader to authenticate a user on behalf of an application. The following description of method 900 is provided with reference to the software and hardware components described herein and shown in FIGS. 1-8 and 10-11. It will be appreciated that following description of method 900 is provided by way of example and is not meant to be limiting. Therefore, it is to be understood that method 900 may include additional and/or alternative steps relative to those illustrated in FIG. 9. Further, it is to be understood that method 900 may be performed in any suitable order. Further still, it is to be understood that one or more steps may be omitted from method 900 without departing from the scope of this disclosure. It will also be appreciated that method 900 also may be performed in other contexts using other suitable components.

As indicated at 904, an application may seek to authenticate a user. The application may take any suitable form, including an application on a user's computing device or an application hosted on another computing device, such as a web server. Some examples of applications include a bank website, a cloud storage client, and a SaaS application.

At 908, the method 900 includes receiving, from the application, a request to authenticate a user. Responsive to the request, at 912, the method 900 includes activating a fingerprint reader integrated into a power key. At 916, the method 900 includes activating a visual indicator at the power key to indicate the status of the fingerprint reader as being active. At 920, the method 900 includes disabling a standby function of the power key. As described above, steps 912-920 may be performed at substantially the same time. In this manner, the user may be allowed to depress and actuate the power key in the process of using the fingerprint reader without putting the computing device to sleep.

At 924, the method 900 includes reading a fingerprint of the user. As described above, the fingerprint of the user may be captured when the user touches the fingerprint reader, without actuating the power key. In other examples, the fingerprint of the user may be captured when the power key is actuated.

Next, at 928, the method 900 includes determining whether the fingerprint is valid. As described above, determining whether the fingerprint is valid may include comparing one or more features of the fingerprint to one or more registered fingerprints stored on the user's computing device or a remote storage device. When authentication is requested by a remote application (e.g. via a website), it will be appreciated that the one or more registered fingerprints may be maintained by one or more devices associated with the remote application.

When the fingerprint is not valid, the method 900 may include notifying the application that the user was not authenticated. In other examples, the method 900 may include continuing to prompt the user for authentication. When the fingerprint of the user is valid, the method 900 includes, at 932, deactivating the visual indicator and at 936, re-enabling the standby function of the power key. In some examples, steps 932 and 936 may be performed at substantially the same time.

In some examples, when the user is authenticated via the fingerprint reader, the method 900 may include providing a credential of the user to the application. For example, when the fingerprint is valid, the laptop computing device 104 may retrieve a stored password for a banking website and transmit the password to the banking website along with a login request. In other examples, providing the credential of the user may include providing the user's fingerprint and/or data describing the user's fingerprint to the application. In this manner, at 940, the method 900 may include unlocking the application, such as a native application stored on the laptop computing device. In some examples, the application may be unlocked within 100 ms of reading the user's fingerprint. In other examples, it may be desirable to unlock the application within 50 ms of reading the user's fingerprint.

Figure 10A:
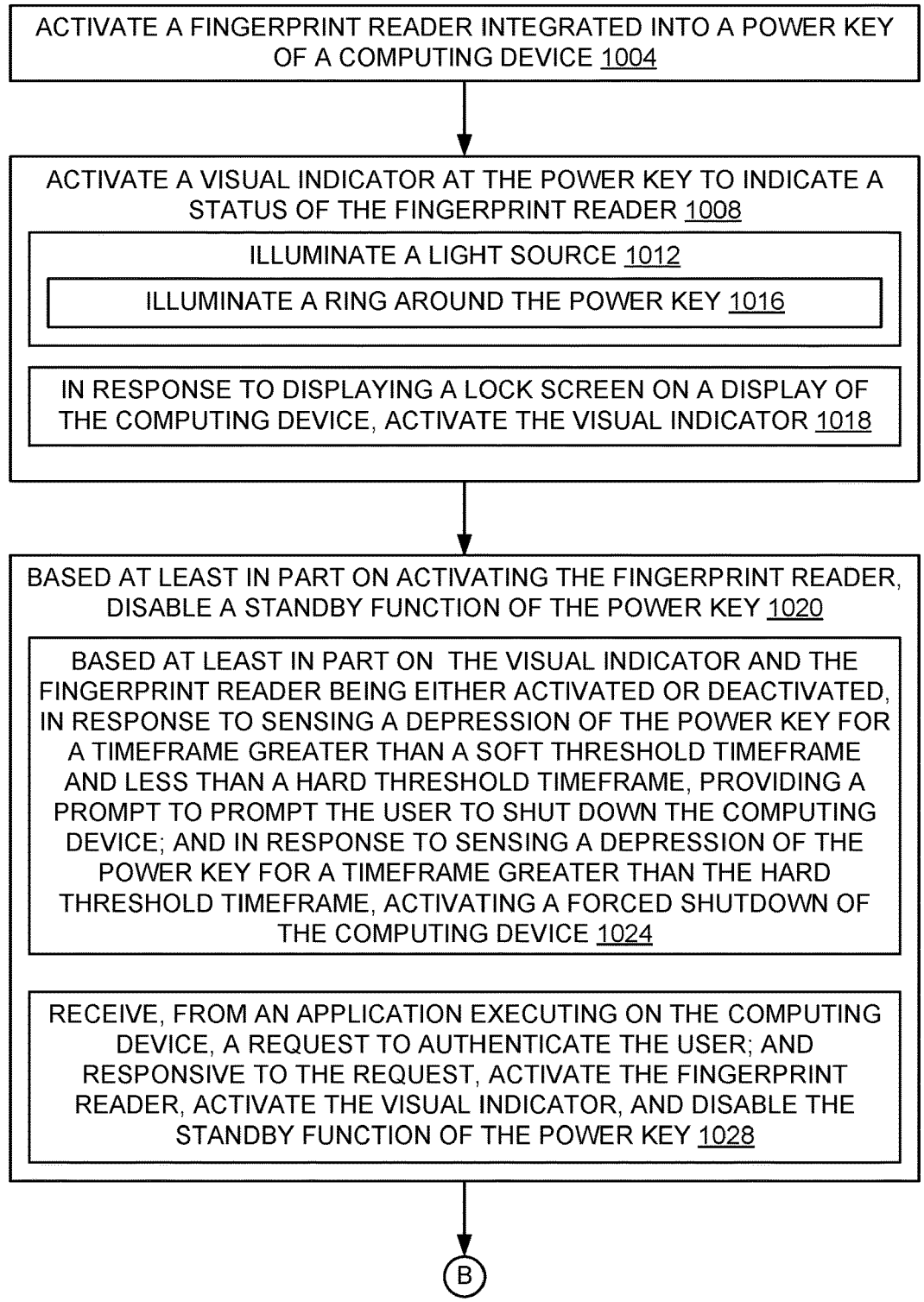
FIGS. 10A and 10B show a flow diagram of another example method for authenticating a user according to examples of the present disclosure.
Figure 10B:
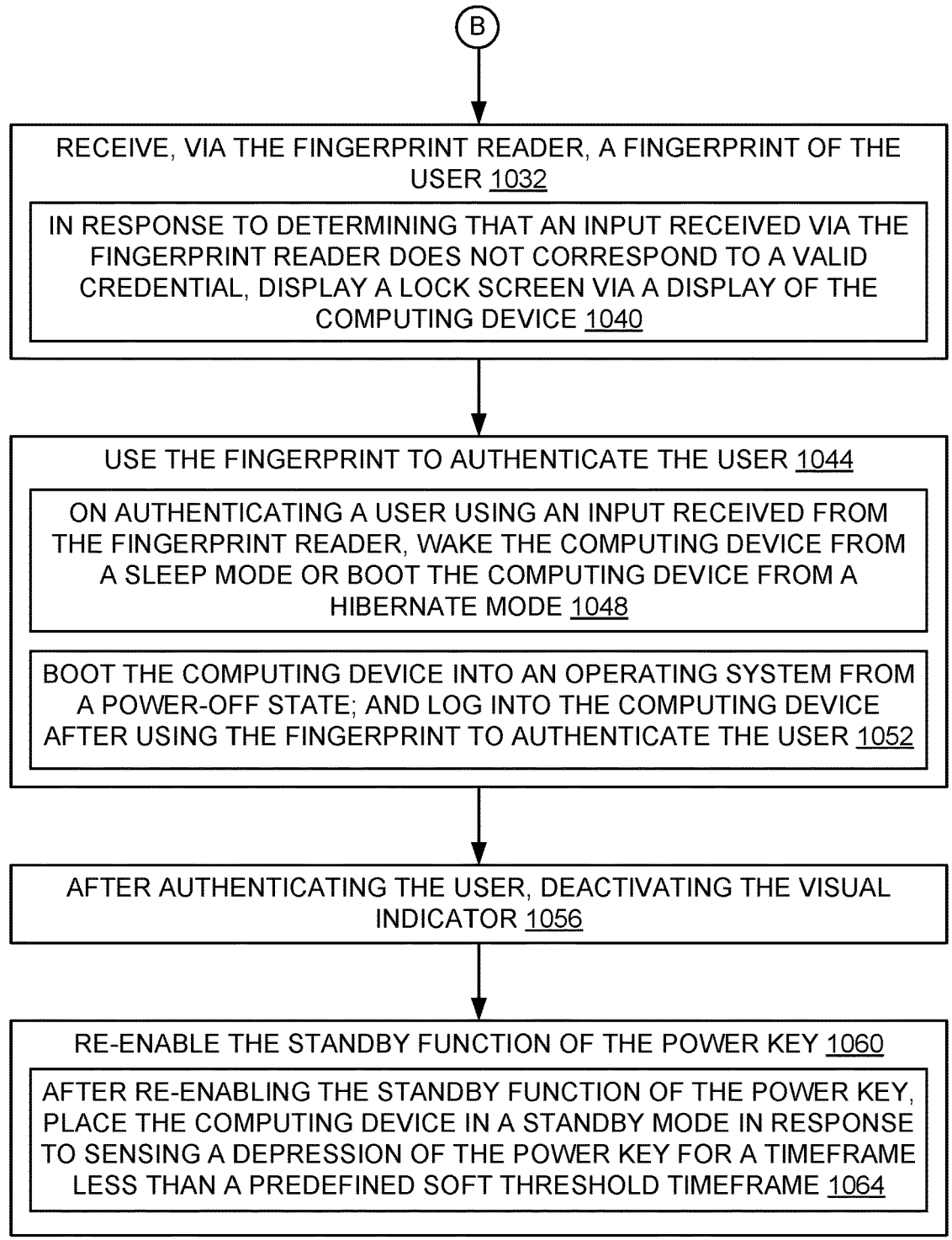

With reference now to FIGS. 10A and 10B, a flow diagram is illustrated depicting an example method 1000 for using a combined power key and fingerprint reader to authenticate a user, including using a visual indicator to indicate a status of the fingerprint reader. The following description of method 1000 is provided with reference to the software and hardware components described herein and shown in FIGS. 1-9 and 11. For example, the method 1000 may be performed by the laptop computing device 104 of FIG. 1, hardware, software, or firmware of the laptop computing device 104, or some suitable combination of components described herein.

It will be appreciated that following description of method 1000 is provided by way of example and is not meant to be limiting. Therefore, it is to be understood that method 1000 may include additional and/or alternative steps relative to those illustrated in FIGS. 10A and 10B. Further, it is to be understood that method 1000 may be performed in any suitable order. Further still, it is to be understood that one or more steps may be omitted from method 1000 without departing from the scope of this disclosure. It will also be appreciated that method 1000 also may be performed in other contexts using other suitable components.

With reference to FIG. 10A, at 1004, the method 1000 includes activating a fingerprint reader integrated into a power key of a computing device. At 1008, the method 1000 includes activating a visual indicator at the power key to indicate a status of the fingerprint reader. At 1012, the method 1000 may include, wherein activating the visual indicator comprises illuminating a light source. At 1016, the method 1000 may include, wherein illuminating the light source comprises illuminating a ring around the power key. At 1018, the method 1000 may include, in response to displaying a lock screen on a display of the computing device, activating the visual indicator.

At 1020, the method 1000 includes, based at least in part on activating the fingerprint reader, disabling a standby function of the power key. At 1024, the method 1000 may include, based at least in part on the visual indicator and the fingerprint reader being either activated or deactivated, in response to sensing a depression of the power key for a timeframe greater than a predefined first threshold timeframe and less than a predefined second threshold timeframe, providing a prompt to prompt the user to shut down the computing device; and in response to sensing a depression of the power key for a timeframe greater than the predefined second threshold timeframe, activating a forced shutdown of the computing device. At 1028, the method 1000 may include receiving, from an application executing on the computing device, a request to authenticate the user; and responsive to the request, activating the fingerprint reader, activating the visual indicator, and disabling the standby function of the power key.

With reference now to FIG. 10B, at 1032, the method 1000 includes receiving, via the fingerprint reader, a fingerprint of the user. At 1040, the method 1000 may include, in response to determining that an input received via the fingerprint reader does not correspond to a valid credential, displaying a lock screen via a display of the computing device.

At 1044, the method 1000 includes using the fingerprint to authenticate the user. At 1048, the method 1000 may include, on authenticating a user using an input received from the fingerprint reader, waking the computing device from a sleep mode or booting the computing device from a hibernate mode. At 1052, the method 1000 may include booting the computing device into an operating system from a power-off state; and logging into the computing device after using the fingerprint to authenticate the user.

At 1056, the method 1000 includes, after authenticating the user, deactivating the visual indicator. At 1060, the method 1000 includes re-enabling the standby function of the power key. At 1064, the method 1000 includes after re-enabling the standby function of the power key, placing the computing device in a standby mode in response to sensing a depression of the power key for a timeframe less than a predefined first threshold timeframe.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
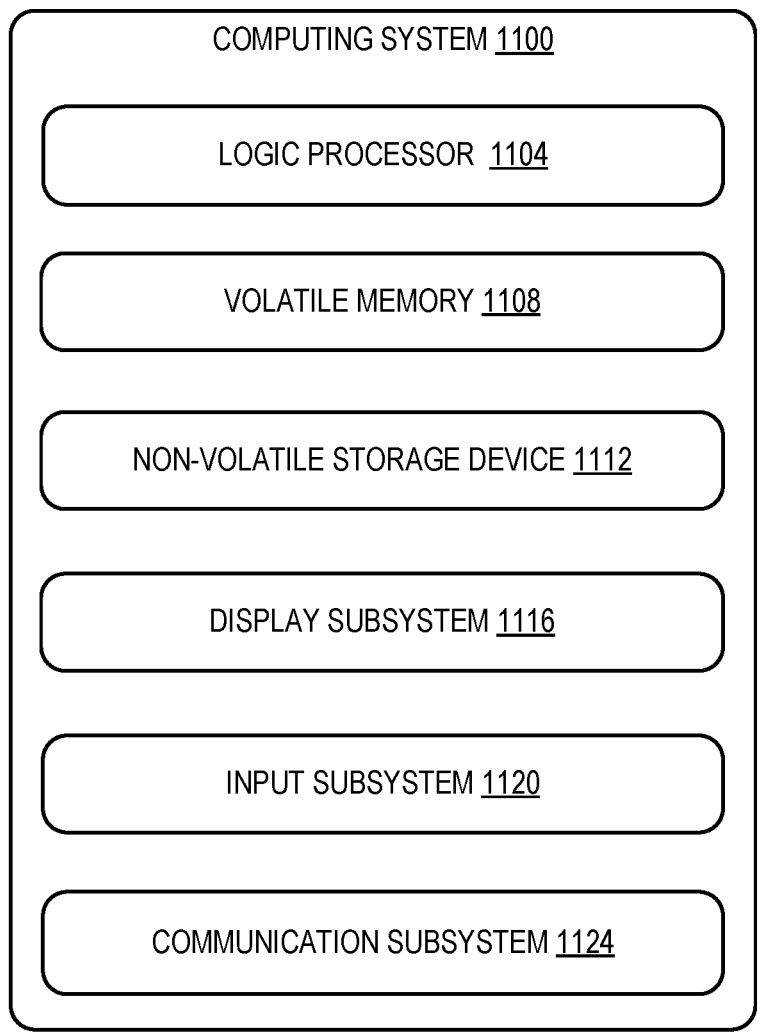
FIG. 11 shows a block diagram of an example computing system according to examples of the present disclosure.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices. In the above examples, the laptop computing device 104 may comprise computing system 1100 or one or more aspects of computing system 1100.

Computing system 1100 includes a logic processor 1104, volatile memory 1108, and a non-volatile storage device 1112. Computing system 1100 may optionally include a display subsystem 1116, input subsystem 1120, communication subsystem 1124, and/or other components not shown in FIG. 11.

Logic processor 1104 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1104 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1104 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 1108 may include physical devices that include random access memory (RAM). Volatile memory 1108 is typically utilized by logic processor 1104 to temporarily store information during processing of software instructions. It will be appreciated that volatile memory 1108 typically does not continue to store instructions when power is cut to the volatile memory 1108.

Non-volatile storage device 1112 includes one or more physical devices configured to hold instructions executable by the logic processors to implement the methods and processes described herein. When such methods and processes are implemented, the state of non-volatile storage device 1112 may be transformed—e.g., to hold different data.

Non-volatile storage device 1112 may include physical devices that are removable and/or built-in. Non-volatile storage device 1112 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1112 may include nonvolatile, dynamic, static, read/write, read-only, sequential-access, location-addressable, file-addressable, and/or content-addressable devices. It will be appreciated that non-volatile storage device 1112 is configured to hold instructions even when power is cut to the non-volatile storage device 1112.

Aspects of logic processor 1104, volatile memory 1108, and non-volatile storage device 1112 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 1100 typically implemented in software by a processor to perform a particular function using portions of volatile memory, which function involves transformative processing that specially configures the processor to perform the function. Thus, a program or application may be instantiated via logic processor 1104 executing instructions held by non-volatile storage device 1112, using portions of volatile memory 1108. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1116 may be used to present a visual representation of data held by non-volatile storage device 1112. As the herein described methods and processes change the data held by the non-volatile storage device, and thus transform the state of the non-volatile storage device, the state of display subsystem 1116 may likewise be transformed to visually represent changes in the underlying data. Display subsystem 1116 may include one or more display devices utilizing virtually any type of technology. Such display devices may be combined with logic processor 1104, volatile memory 1108, and/or non-volatile storage device 1112 in a shared enclosure, or such display devices may be peripheral display devices.

When included, input subsystem 1120 may comprise or interface with the one or more user-input devices such as a keyboard, mouse, touch screen, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1124 may be configured to communicatively couple various computing devices described herein with each other, and with other devices. Communication subsystem 1124 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1100 to send and/or receive messages to and/or from other devices via a network such as the Internet.

The following paragraphs provide additional support for the claims of the subject application. One aspect provides a method for authenticating a user at a computing device, the method comprising: activating a fingerprint reader integrated into a power key of the computing device; activating a visual indicator at the power key to indicate a status of the fingerprint reader; based at least in part on activating the fingerprint reader, disabling a standby function of the power key; receiving, via the fingerprint reader, a fingerprint of the user; using the fingerprint to authenticate the user; after authenticating the user, deactivating the visual indicator; and re-enabling the standby function of the power key.

The method may additionally or alternatively include, wherein activating the visual indicator comprises illuminating a light source. The method may additionally or alternatively include, wherein illuminating the light source comprises illuminating a ring around the power key. The method may additionally or alternatively include, after re-enabling the standby function of the power key, placing the computing device in a standby mode in response to sensing a depression of the power key for a timeframe less than a predefined first threshold timeframe.

The method may additionally or alternatively include, based at least in part on the visual indicator and the fingerprint reader being either activated or deactivated, in response to sensing a depression of the power key for a timeframe greater than a predefined first threshold timeframe and less than a predefined second threshold timeframe, providing a prompt to prompt the user to shut down the computing device; and in response to sensing a depression of the power key for a timeframe greater than the predefined second threshold timeframe, activating a forced shutdown of the computing device.

The method may additionally or alternatively include booting the computing device from a power-off state; and logging into the computing device after using the fingerprint to authenticate the user. The method may additionally or alternatively include, in response to displaying a lock screen on a display of the computing device, activating the visual indicator.

The method may additionally or alternatively include, in response to determining that an input received via the fingerprint reader does not correspond to a valid credential, displaying a lock screen via a display of the computing device. The method may additionally or alternatively include, on authenticating a user using an input received from the fingerprint reader, waking the computing device from a sleep mode or booting the computing device from a hibernate mode. The method may additionally or alternatively include receiving, from an application executing on the computing device, a request to authenticate the user; and responsive to the request, activating the fingerprint reader, activating the visual indicator, and disabling the standby function of the power key.

Another aspect provides a computing device, comprising: a keyboard; a power key on the keyboard, the power key including an integrated fingerprint reader; a visual indicator configured to indicate a status of the fingerprint reader; a processor; and a memory storing instructions executable by the processor to carry out a method for authenticating a user.

Another aspect provides a computer program which when executed on a computing device is configured to carry out a method for authenticating a user according to any of the techniques described herein.

Another aspect provides a method for authenticating a user at a computing device, the method comprising: receiving, from an application, a request to authenticate the user; responsive to the request, activating a fingerprint reader integrated into a power key of the computing device, and activating a visual indicator at the power key to indicate a status of the fingerprint reader; based at least in part on activating the fingerprint reader, disabling a standby function of the power key; authenticating the user via the fingerprint reader; providing a credential to the application based at least in part on authenticating the user; and after authenticating the user, deactivating the visual indicator and re-enabling the standby function of the power key.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for authenticating a user at a computing device, the method comprising:
   activating a fingerprint reader integrated into a power key of the computing device;
   activating a visual indicator at the power key to indicate a status of the fingerprint reader;
   based at least in part on activating the fingerprint reader, disabling a standby function of the power key;
   receiving, via the fingerprint reader, a fingerprint of the user;
   using the fingerprint to authenticate the user;
   after authenticating the user, deactivating the visual indicator; and
   re-enabling the standby function of the power key.

2. The method of claim 1, wherein activating the visual indicator comprises illuminating a light source.

3. The method of claim 2, wherein illuminating the light source comprises illuminating a ring around the power key.

4. The method of claim 1, further comprising, after re-enabling the standby function of the power key, placing the computing device in a standby mode in response to sensing a depression of the power key for a timeframe less than a predefined first threshold timeframe.

5. The method of claim 1, further comprising:
   based at least in part on the visual indicator and the fingerprint reader being either activated or deactivated, in response to sensing a depression of the power key for a timeframe greater than a predefined first threshold timeframe and less than a predefined second threshold timeframe, providing a prompt to prompt the user to shut down the computing device; and
   in response to sensing a depression of the power key for a timeframe greater than the predefined second threshold timeframe, activating a forced shutdown of the computing device.

6. The method of claim 1, further comprising:
   booting the computing device from a power-off state; and
   logging into the computing device after using the fingerprint to authenticate the user.

7. The method of claim 1, further comprising, in response to displaying a lock screen on a display of the computing device, activating the visual indicator.

8. The method of claim 1, further comprising, in response to determining that an input received via the fingerprint reader does not correspond to a valid credential, displaying a lock screen via a display of the computing device.

9. The method of claim 1, further comprising, on authenticating the user using an input received from the fingerprint reader, waking the computing device from a sleep mode or booting the computing device from a hibernate mode.

10. The method of claim 1, further comprising:
    receiving, from an application executing on the computing device, a request to authenticate the user; and
    responsive to the request, activating the fingerprint reader, activating the visual indicator, and disabling the standby function of the power key.

11. A computing device, comprising:
    a keyboard;
    a power key on the keyboard, the power key including an integrated fingerprint reader;
    a visual indicator configured to indicate a status of the fingerprint reader;
    a processor; and
    a memory storing instructions executable by the processor to
       activate the visual indicator and the fingerprint reader;
       based at least in part on activating the fingerprint reader, disable a standby function of the power key;
       receive, via the fingerprint reader, a fingerprint of a user;
       use the fingerprint to authenticate the user;
       after authenticating the user, deactivate the visual indicator; and
       re-enable the standby function of the power key.

12. The computing device of claim 11, wherein the visual indicator comprises a light source, and wherein the instructions are executable to illuminate the light source.

13. The computing device of claim 11, wherein the visual indicator comprises a light source extending around at least a portion of the power key, and wherein the instructions are executable to illuminate the light source.

14. The computing device of claim 11, wherein the instructions are further executable to, after re-enabling the standby function of the power key, place the computing device in a standby mode in response to sensing a depression of the power key for a timeframe less than a predefined first threshold timeframe.

15. The computing device of claim 11, wherein the instructions are further executable to:
    based at least in part on the visual indicator and the fingerprint reader being either activated or deactivated, in response to sensing a depression of the power key for a timeframe greater than a predefined first threshold timeframe and less than a predefined second threshold timeframe, provide a prompt to prompt the user to shut down the computing device; and in response to sensing a depression of the power key for a timeframe greater than the predefined second threshold timeframe, activate a forced shutdown of the computing device.

16. The computing device of claim 11, wherein the instructions are further executable to:
 boot the computing device from a power-off state; and
 log into the computing device after using the fingerprint to authenticate the user.

17. The computing device of claim 11, further comprising a display, and wherein the instructions are further executable to activate the visual indicator in response to displaying a lock screen on the display.

18. The computing device of claim 11, wherein the instructions are further executable to, on authenticating the user based upon an input received from the fingerprint reader, wake the computing device from a sleep mode or boot the computing device from a hibernate mode.

19. The computing device of claim 11, wherein the instructions are further executable to:
 receive, from an application executing on the computing device, a request to authenticate the user; and
 responsive to the request, activate the fingerprint reader, activate the visual indicator, and disable the standby function of the power key.

20. A method for authenticating a user at a computing device, the method comprising:
 receiving, from an application, a request to authenticate the user;
 responsive to the request, activating a fingerprint reader integrated into a power key of the computing device, and activating a visual indicator at the power key to indicate a status of the fingerprint reader;
 based at least in part on activating the fingerprint reader, disabling a standby function of the power key;
 authenticating the user via the fingerprint reader;
 providing a credential to the application based at least in part on authenticating the user; and
 after authenticating the user, deactivating the visual indicator and re-enabling the standby function of the power key.

\* \* \* \* \*